M. P. WINTHER.
METAL VEHICLE WHEEL
APPLICATION FILED FEB. 6, 1920.

1,364,341.

Patented Jan. 4, 1921.
2 SHEETS—SHEET 1.

Inventor
Martin P. Winther

M. P. WINTHER.
METAL VEHICLE WHEEL.
APPLICATION FILED FEB. 6, 1920.
1,364,341.
Patented Jan. 4, 1921.
2 SHEETS—SHEET 2.
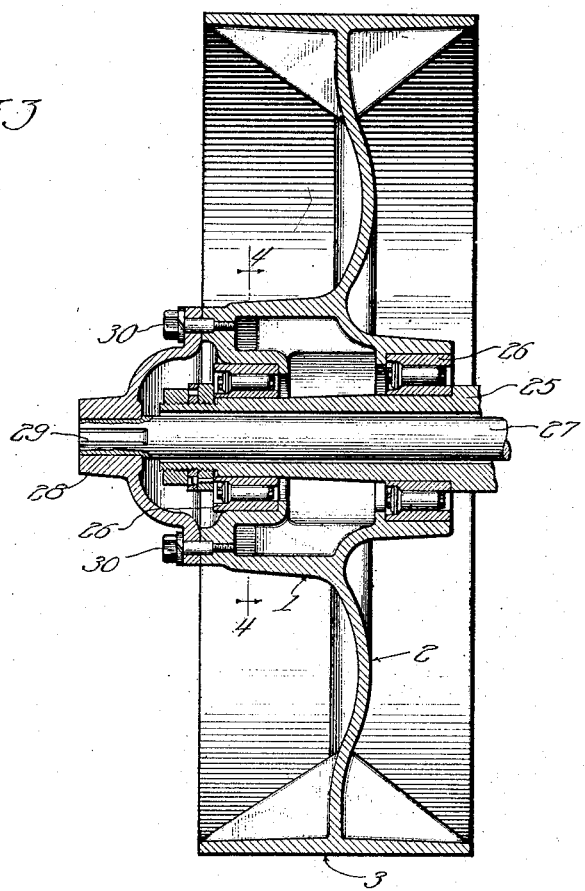
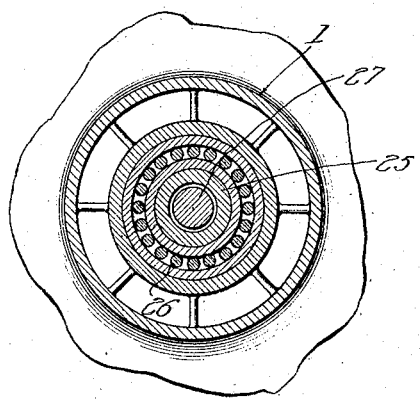
Inventor
Martin P. Winther

UNITED STATES PATENT OFFICE.

MARTIN P. WINTHER, OF KENOSHA, WISCONSIN, ASSIGNOR TO KENOSHA WHEEL & AXLE COMPANY, OF KENOSHA, WISCONSIN, A CORPORATION OF WISCONSIN.

METAL VEHICLE-WHEEL.

1,364,341.  Specification of Letters Patent.  Patented Jan. 4, 1921.

Application filed February 6, 1920. Serial No. 356,628.

*To all whom it may concern:*

Be it known that I, MARTIN P. WINTHER, a citizen of the United States, and a resident of Kenosha, in the county of Kenosha and State of Wisconsin, have invented certain new and useful Improvements in Metal Vehicle-Wheels, of which the following is a specification.

This invention relates to improvements in metal vehicle wheels, and more particularly to an improved construction for cast metal drive wheels such as used in motor vehicles of the commercial type.

The purpose of this invention is to provide a construction for drive wheels whereby greater strength is secured in order to offer greater resistance to the torsional stresses created in the material of the wheels by the forces acting upon the same in their rotation of driving. The results are accomplished by certain new and novel features of construction pertaining more particularly to the hub of the wheel, as will hereinafter be more fully set forth, and in connection with the accompanying drawings, wherein—

Figure 1:
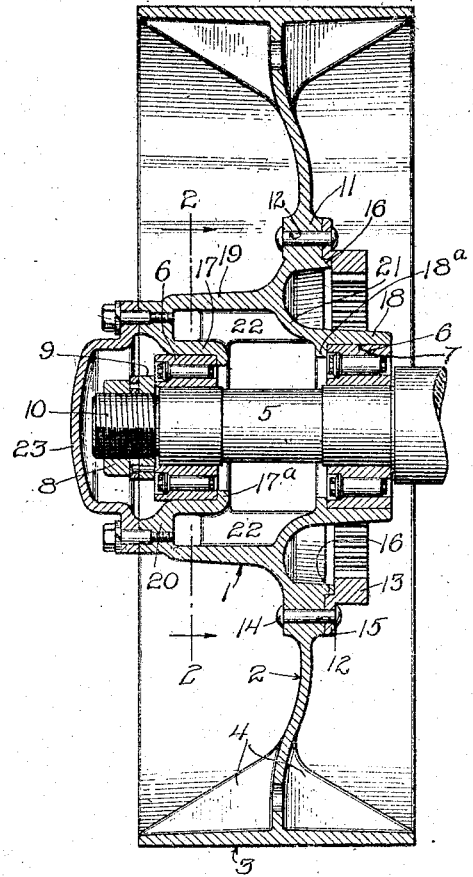
Figure 2:
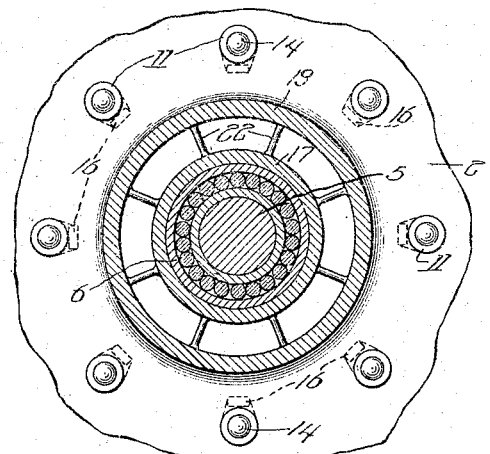

Figure 1 is a view in vertical section of the wheel as applied in an internal gear drive embodying the features of the invention, Fig. 2 is a cross-sectional view of the wheel hub taken on line 2, 2, of Fig. 1, with the annular gear wheel removed, and Fig. 3 is a view in vertical section of the wheel as applied to a live axle type of drive.

A wheel embodying the features of the invention comprises parts which in general are common to all wheels of cast metal construction, namely, a hub 1, an integral disk or web 2, and a transverse peripheral band or felly 3, the web and felly being preferably reinforced by means of a plurality of radially disposed webs 4, located between the under surface of the felly and either face of the disk 2. The hub 1 is designed to be journaled on the spindle 5 of the load supporting axle of the vehicle, there being employed roller bearings 6, 6, mounted at either end of the spindle and engaging enlarged annular bearing surfaces 7, 7 provided for the purpose, and likewise, corresponding internal annular bearing surfaces on the hub, as will hereinafter be set forth. A nut 8 and thrust collar 9 are mounted on the threaded end portion 10 of the spindle and retain the hub in place.

The disk or web 2 of the wheel is provided with a plurality of bosses 11 arranged in a circle surrounding the hub in close proximity thereto. These bosses are provided with bolt or rivet holes 12 extending transversely through them. Fixed to the inner face of the wheel is an internal or ring gear wheel 13 engaging the several bosses and secured by means of of bolts or rivets 14 extending through the holes 12 and registering holes formed in a flange 15 of the gear wheel. Each of the bosses is preferably provided with an integral lug 16 bearing against the gear wheel and serving to center the same upon the wheel.

Referring now more in detail to the features of construction of the wheel and particularly of the hub 1 thereof, the latter may be said to be of a double wall structure, namely, an internal wall or rather wall sections 17 and 18, and an external wall 19, spaced from and concentric with the internal wall or wall sections 17 and 18. The inner wall sections are rings of the normal thickness of metal, located at the ends of the hub structure and form the radial bearing surfaces engaging the roller bearings 6, 6, said walls or wall sections 17 and 18 being provided at their inner ends with integral flanges 17ª and 18ª respectively for the retention of said bearings. The longitudinal space between the wall sections 17 and 18 is preferably open to permit the proper casting of the hub structure, and further for the reason that a connecting wall between them would be of no purpose, and would be mere excess metal.

Surrounding the outermost internal wall section 17, and extending to a point midway between said wall sections is an external wall 19 having a diameter considerably greater than the internal wall sections 17, 18, and having a thickness equal to that of said internal wall sections. The external wall is integrally connected to the internal wall sections by means of a transverse end wall 20 joining the outer end of the outermost internal wall section 17 with the corresponding end of the external wall. At the inner end of the external wall 19, an inclined and slightly concave wall 21 extends between said external wall and the adjacent end of the innermost internal wall section 18. At the junction of the inclined connecting wall 21 and the external wall 19, the latter is also connected with the disk or web 2 of the wheel, it being noted that a comparatively short radial distance separates the external wall of the hub and the bosses which constitute the point of connection of the annular gear 13 to the wheel.

The arrangement of concentric annular walls and connecting transverse end walls thus described, forms in effect a hollow hub structure wherein the thickness of metal used does not exceed the normal thickness employed throughout the wheel. This hub structure is, however, reinforced or strengthened by the provision of a plurality of radial webs 22 cast integral within the annular space between the concentric walls, said webs extending radially between the outer internal wall section 17 and the external wall 19, and transversely from a point midway the ends for said wall section 17, to the transverse connecting wall 22.

The hub structure is completed by the hub cap 23 which is applied over the outer end of the hub and secured by means of a plurality of cap screws 24 extending through the marginal flange of the cap and anchored in the end wall 20 of the hub structure.

In Figs. 3 and 4 is illustrated the application of the same wheel construction in the so-called live axle drive, wherein the wheel is journaled on a hollow dead axle or spindle 25 by means of the pairs of anti-friction bearings 26, 26. A live axle 27 extends through the hollow spindle 25 and projects into the hub cap 28 which is keyed to the shaft by the keys or splines 29. The hub cap in turn is fixed to the wheel proper by the cap screws 30. In other respects the wheel construction is the same as heretofore described with the exception of those parts that would, of necessity, be eliminated.

The advantages of the construction herein described and illustrated will be understood from the following: In addition to the vertical or dead weight stress upon a wheel there is also a torsional stress present, due to the application of the turning forces and the frictional and road resistances, opposing the turning force, the latter being substantially constant regardless of the type of drive, although the turning forces vary depending on the point of application of the powers. In the live axle type of drive, the power is applied at the center of the wheel and declined directly to the hub through the hub cap or the circle of screws 30. A great torsion stress is manifestly set up in the hub, varying inversely proportional to the radius at the point of application of the turning force. Furthermore, the power being delivered at the end of the wheel, and offset from the plane of the rim, certain bending stresses are set up in the hub in addition to the torsional stresses. Therefore, by increasing the radius of the hub so that it is equal to or greater than the radius at the point of application of the power, the stresses are distributed throughout a larger circumference and the strain per square inch is correspondingly reduced. In other words, the strength of the hub is materially increased by providing a structure designed with a view of resisting the torsional and bending stresses, which the drive wheel must be subjected to.

In an internal gear type of drive, the power is delivered to the wheel at the web between the hub and the rim. Torsional stresses are likewise set up in the hub, but perhaps varying in magnitude from the stresses of like character in other types of drive, but, nevertheless, are present and demand the necessary strength in the hub to resist them. For example, the side slipping or skidding of the vehicle, and severe road conditions, place extreme and sudden stresses on the wheels, and especially the hub portions thereof.

To merely increase the thickness of metal of the hub would but partially accomplish the end in view, for by so doing, the weight of metal would be unduly increased. On the other hand, by employing a double wall construction, the strength of the wheel is greatly increased without materially increasing the mass of metal in the hub, the walls being of the normal, if not reduced, thickness of metal ordinarily required, and the reinforcing webs provide the necessary resistance to the various stresses without adding materially to the weight of the wheel.

Having described the features embodying the invention, the same is further set forth in the appended claims, it being understood that I do not wish to be limited as to the scope of the invention except as therein specified.

I claim as my invention:

1. A metal wheel comprising integrally cast hub, felly and intermediate web members, said hub member comprising concentrically arranged and radially spaced annular wall sections, the outer wall section having integral connection with said web section, transverse wall sections connecting the ends of said outer wall section with said inner wall section, and a plurality of radially extending webs within the space between said annular wall sections.

2. A metal wheel comprising integrally cast hub, felly, and intermediate web members, said hub member embracing concentrically arranged and radially spaced annular wall sections, said outer wall section being integral with said web member, and a plurality of webs formed integral with and extending radially between said annular wall sections.

3. A metal wheel comprising hub, felly, and intermediate web members, cast integrally of metal of substantially uniform thickness, said hub member consisting of a radially reinforced hollow structure having an outer wall of relatively increased diameter integrally formed with said web member, the latter being correspondingly decreased in its radial dimension.

In witness whereof, I hereunto subscribe my name this 31 day of December, A. D. 1919.

MARTIN P. WINTHER.